(12) United States Patent
Bharti et al.

(10) Patent No.: US 10,444,703 B2
(45) Date of Patent: Oct. 15, 2019

(54) METHOD AND SYSTEM FOR SIMULATION OF FORCES USING HOLOGRAPHIC OBJECTS

(71) Applicant: International Business Machines Corporation, Armonk, NY (US)

(72) Inventors: Harish Bharti, Pune (IN); Abhay K. Patra, Pune (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 15/662,759

(22) Filed: Jul. 28, 2017

(65) Prior Publication Data

US 2019/0033780 A1    Jan. 31, 2019

(51) Int. Cl.
| | | |
|---|---|---|
| *G03H 1/00* | (2006.01) | |
| *G06F 3/01* | (2006.01) | |
| *G06F 3/0481* | (2013.01) | |
| *G06F 3/03* | (2006.01) | |
| *G03H 1/26* | (2006.01) | |
| *G03H 3/00* | (2006.01) | |
| *G09B 23/10* | (2006.01) | |

(Continued)

(52) U.S. Cl.
CPC ......... *G03H 1/0005* (2013.01); *G03H 1/2645* (2013.01); *G03H 3/00* (2013.01); *G06F 3/016* (2013.01); *G06F 3/017* (2013.01); *G06F 3/0304* (2013.01); *G06F 3/04815* (2013.01); *G03H 1/2294* (2013.01); *G03H 2001/0061* (2013.01); *G03H 2001/0224* (2013.01); *G03H 2001/266* (2013.01); *G03H 2225/60* (2013.01); *G03H 2226/05* (2013.01); *G09B 23/10* (2013.01)

(58) Field of Classification Search
None
See application file for complete search history.

(56) References Cited

U.S. PATENT DOCUMENTS 6,211,848 B1    4/2001   Plesniak et al.
6,421,048 B1    7/2002   Shih et al.
(Continued)

OTHER PUBLICATIONS

Anderson, John; "Mid-air holograms respond to human touch"; newatlas.com; Dec. 9, 2015; Printed Jun. 28 2017; pp. 5; <http://newatlas.com/touchable-mid-air-holograms/40845>.

(Continued)

*Primary Examiner* — Jennifer D. Carruth
(74) *Attorney, Agent, or Firm* — Robert Shatto; Hoffman Warnick LLC

(57) ABSTRACT

The disclosure is directed to simulating forces using holographic objects. A method according to embodiments includes: generating an invisible holographic object, the invisible holographic object providing a haptic effect; displaying a visible holographic object; aligning the visible holographic object and the invisible holographic object to provide a visible and touchable combined holographic object, the combined holographic object providing the haptic effect; applying a force to the combined holographic object, the applied force causing a displacement of the combined holographic object and including an amplitude and direction; and adjusting the haptic effect of the combined holographic object to generate an adjusted haptic effect representative of an effect of the applied force on the combined holographic object.

16 Claims, 6 Drawing Sheets

(51) Int. Cl.
   *G03H 1/22* (2006.01)
   *G03H 1/02* (2006.01)

(56) References Cited

U.S. PATENT DOCUMENTS

| | | | |
|---|---|---|---|
| 8,564,865 | B2 | 10/2013 | Klug et al. |
| 8,952,990 | B2 | 2/2015 | Oh et al. |
| 2013/0207886 | A1 | 8/2013 | Hall |
| 2013/0326364 | A1 | 12/2013 | Latta et al. |
| 2014/0306891 | A1 | 10/2014 | Latta et al. |
| 2015/0220058 | A1 | 8/2015 | Mukhtarov et al. |
| 2016/0246376 | A1* | 8/2016 | Birnbaum .............. G06F 3/016 |

OTHER PUBLICATIONS

Bimber, Oliver et al.; "Interacting with augmented holograms"; pp. 14.

Cervantes; "Samsung files patent for smartphone that can display holographic images"; Androidaurthority.com; pp. 5; Printed Jun. 28, 2017; <http://www.androidauthority.com/samsung-patent-smartphone-holographic-images-633167/>.

Cheng, Qiluan et al.; "Directionally Hiding Objects and Creating Illusions at Visible Wavelengths by Holography"; Scientific Reports; Published Jun. 12, 2013; pp. 9; Printed Jun. 28, 2017; Copyright 2013 Macmillan Published Limited; <https://www.ncbi.nlm.nih.gov/pmc/articles/PMC3679505/>.

Unknown; "Components of a Force"; Pinoy Math Comunity MATHalino.com; pp. 5; Printed Jun. 28, 2017; Copyright 2017 Romel Verterra; <http://www.mathalino.com/reviewer/engineering-mechanics/components-of-a-force>.

Culpa, Daniel; "You can actually touch these 3D holograms"; Wired Haptics; Jul. 3, 2015; pp. 6; Printed Jun. 28, 2017; <http://www.wired.co.uk/article/haptic-japanese-holograms>.

Unknown; "X- and Y-Components of a Force Vector"; Zona Land Education; pp. 8; Printed Jun. 28, 2017; <http://zonalandeducation.com/mstm/physics/mechanics/forces/forceComponents/forceComponents.html>.

Lim, Kian-Meng et al.; "Calculation of Acoustic Radiation Force and Moment in Microfluidic Devices"; World Scientific; 5th International Symposium on Physics of Fluids (ISPF5); International Journal of Moder Physics: Conference Series; vol. 34; 2014; pp. 16; Copyright Authors.

Unkinown; "New reality: Invisible 3D holograms that can be touched and felt"; RT News; Published Dec. 3, 2014; pp. 5; Printed Jun. 28, 2017; https://www.rt.com/news/210911-3d-ultrasound-holograms-touch/>.

Pappu, Ravikanth et al.; "Haptic international with holographic video images"; Published in Proceedings of the IS&T/SPIE's Symposium on Electronic Imaging, Practical Holography XII; 1998; pp. 8.

Plesniak, Wendy et al.; "Coincident Display Using Haptics and Holographic Video"; Published in Proceedings of Conference on Human Factors in Computing Systems (CHI '98); ACM; Apr. 1998; pp. 8.

Plesniak, Wendy et al.; "Spaitial Interaction with Haptic Holograms"; Published in Proceedings of the IEEE International Conference on Multimedia Computing and Systems; Jun. 1999; pp. 14.

Unknown; "Resolution of Forces"; The Physics Classroom; Vectors-Motion and Forces in Two Dimensions; Lesson 3; Forces in Two Dimensions; pp. 3; Printed Jun. 28, 2017.

Starr, Michelle; "Ultrasound creates a haptic shape that can be seen and felt"; CNET; Dec. 2, 2014; pp. 4; Printed Jun. 28, 2017; <https://www.cnet.com/news/ultrasound-creates-a-haptic-shape-that-can-be-seen-and-felt/>.

Unknown; "Acoustic radiation force"; Wikipedia, the free encyclopedia; Printed Jun. 28, 2017; pp. 3; <https://en.wikipedia.org/wiki/Acoustic_radiation_force>.

Unknown; "Fluids in Motion: Cars Course Physics #15"; YouTube; Printed Jun. 28, 2017; pp. 4; <https://www.youtube.com/watch?v=fJefjG3xhW0>.

Long, Benjamin., et al.; "Rendering Volumetric Haptic Shapes in Mid-Air using Ultrasound"; Department of Computer Science, University of Bristol, UK; Proceedings of ACM SIGGRAPH Asia 2014; ACM Transactions on Graphics; vol. 33; No. 6; Article 181; Publication Date Nov. 2017; Copyright 2014 ACM; pp. 11; <http://doi.acm.org/10.1145/2661229.2661257>.

* cited by examiner

METHOD AND SYSTEM FOR SIMULATION OF FORCES USING HOLOGRAPHIC OBJECTS

TECHNICAL FIELD

The present invention relates generally to holography, and more particularly, to a method, system, and computer program product for the simulation of forces using holographic objects.

BACKGROUND

Holographic systems have been developed that are capable of projecting three-dimensional holographic objects in mid-air. Some of these holographic systems are capable of generating a haptic effect when a user touches a holographic object. The haptic effect may be provided, for example, using ultrasonic waves to generate an invisible holographic object. Such holographic systems, however, are directed to the display of static holographic objects, which limits the usefulness of these systems.

SUMMARY

A first aspect of the invention provides a method for simulating forces using holographic objects, including: generating an invisible holographic object, the invisible holographic object providing a haptic effect; displaying a visible holographic object; aligning the visible holographic object and the invisible holographic object to provide a visible and touchable combined holographic object, the combined holographic object providing the haptic effect; applying a force to the combined holographic object, the applied force causing a displacement of the combined holographic object and including an amplitude and direction; and adjusting the haptic effect of the combined holographic object to generate an adjusted haptic effect representative of an effect of the applied force on the combined holographic object.

A second aspect of the invention provides a computerized system for simulating forces using holographic objects by performing a method, the method including: generating an invisible holographic object, the invisible holographic object providing a haptic effect; displaying a visible holographic object; aligning the visible holographic object and the invisible holographic object to provide a visible and touchable combined holographic object, the combined holographic object providing the haptic effect; applying a force to the combined holographic object, the applied force causing a displacement of the combined holographic object and including an amplitude and direction; and adjusting the haptic effect of the combined holographic object to generate an adjusted haptic effect representative of an effect of the applied force on the combined holographic object.

A third aspect of the invention provides a computer program product stored on a computer readable storage medium, which when executed by a computer system, performs a method for simulating forces using holographic objects, the method including: generating an invisible holographic object, the invisible holographic object providing a haptic effect; displaying a visible holographic object; aligning the visible holographic object and the invisible holographic object to provide a visible and touchable combined holographic object, the combined holographic object providing the haptic effect; applying a force to the combined holographic object, the applied force causing a displacement of the combined holographic object and including an amplitude and direction; and adjusting the haptic effect of the combined holographic object to generate an adjusted haptic effect representative of an effect of the applied force on the combined holographic object.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description taken in conjunction with the accompanying drawings that depict various aspects of the invention.

Figure 1:
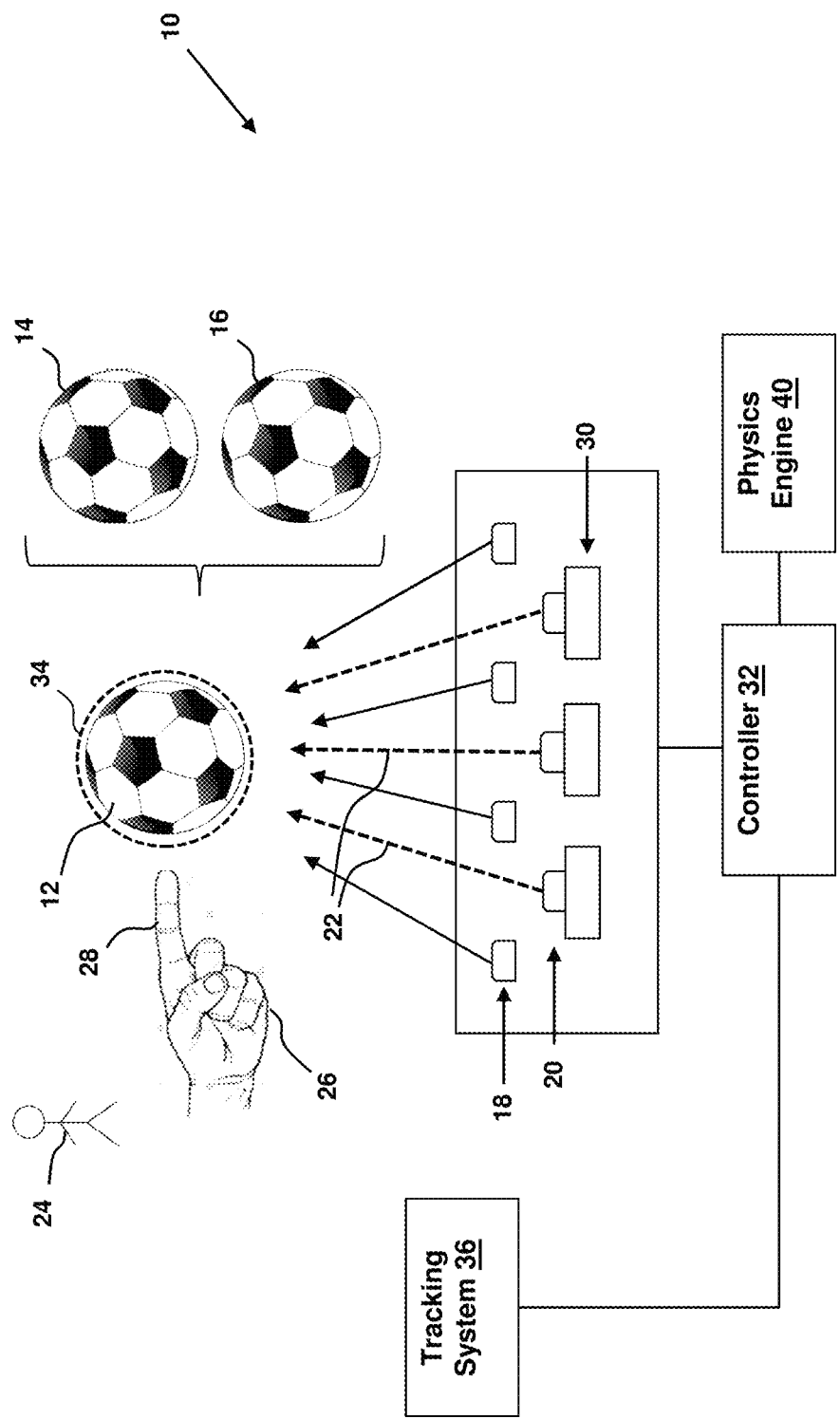
FIG. 1 depicts a system for simulating forces using holographic objects according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The present invention relates generally to holography, and more particularly, to a method, system, and computer program product for the simulation of forces using haptic-enabled holographic objects. An immersive experience is provided, allowing users to feel, touch, and interact with holographic objects in a dynamic manner.

According to embodiments, users may interact with a haptic-enabled holographic object, which may or may not be in motion, by applying an external force, such as a push force, pull force, rotational force, impact force, drag force, etc., to the holographic object. The holographic object is displaced in response to the applied force. A user's finger/hand movement pattern and direction of applied force are tracked using a camera or other suitable device. Various force components are calculated based on the tracking to: adjust the haptic effect associated with the holographic object to allow the user to experience the force applied to the holographic object; and displace the holographic object to allow the user to visualize the influence of the applied force on the holographic object.

A holographic system 10 for generating a holographic object 12 (e.g., a soccer ball) according to embodiments is depicted in FIG. 1. The holographic object 12 is formed by a combination of an invisible holographic object 14 that provides a haptic effect and a visible holographic object 16.

An array of holographic projectors 18 are employed to generate the visible holographic object 16 in a known manner. The invisible holographic object 14 is produced by an array of ultrasound transducers 20. Ultrasonic sound waves 22 generated by the array of ultrasound transducers 20 produce an effect known as acoustic radiation force to create a pressure sensation that can be felt by a user 24 (e.g., by a finger 26 or other portion of a hand 28 of the user 24). A set of driver circuits 30 for the ultrasound transducers 20 can be controlled dynamically, via a controller 32, to adjust the acoustic radiation force based on forces acting on the holographic object 12, as will be described in greater detail below.

A reference point 34 is set by the controller 32 for the creation of the holographic object 12. According to embodiments, the invisible holographic object 14 and the visible holographic object 16 are generated and aligned to form the holographic object 12 at a location in space given by the reference point 34. The reference point 34 may encircle the entire holographic object 12, as shown in FIG. 1, may be located at the center of the holographic object 12, or may be located elsewhere. In any case, the invisible holographic object 14 and the visible holographic object 16 are generated and aligned in accordance with the location of the reference point 34 to form the holographic object 12. If the reference point moves in space, the holographic object 12 is moved accordingly by the controller 32 such that it remains aligned with the reference point 34.

A tracking system 36, coupled to the controller 30, is used to track the location and movement of the user's hand 26 and/or finger 28 relative to the reference point 34 (and thus the holographic object 12). The tracking system 36 may, for example, include a camera. Other tracking methods may also be used.

The controller 32 is configured to control the intensity of the haptic effect experienced by the user 24, based upon the force (or scaled version thereof) applied to the holographic object 12 by the user 24. For example, the user 24 may interact with the holographic object 12 by applying a force at a contact point (or multiple contact points) on the holographic object 12, which may be stationary (FIG. 2) or moving in space (FIG. 3). The force may include, for example, a pull force, push force, drag force, rotational force, impact force, or other type of applied force. In response to the applied force, the controller 32 adjusts the acoustic radiation force (and thus the haptic effect) generated by the ultrasound transducers 20 at the contact point on the holographic object 12 based, for example, on the magnitude of the applied force. That is, the haptic effect at the contact point on the holographic object 12 is proportional to the force applied by the user 24 to the holographic object 12 at the contact point.

The controller 32 is further configured to control the reaction (e.g., displacement) of the holographic object 12 in response to the applied force. A physics engine 40 is provided to calculate, based on the laws of physics, the force (e.g., magnitude, direction) and components thereof applied to the holographic object 12 by the user 24 or applied by the holographic object 12 to the user 24, and the resultant behavior of the holographic object 12 in response to the applied force.

According to embodiments, the acoustic radiation force, and thus the haptic effect of the holographic object 12, is adjusted at the point of contact by the controller 32, based on the applied force. The acoustic radiation force can be controlled dynamically by the controller 32 in accordance with the formula:

$$F=2\alpha I/c$$

where
α is the absorption coefficient
I is the ultrasound intensity, and
c is the longitudinal wave speed in the medium.

In this case, the absorption coefficient α and the longitudinal wave speed c are substantially constant, but the amount of force F can be controlled by varying the ultrasonic intensity I. The ultrasonic intensity I can thus be varied to control the acoustic radiation force (and haptic effect) exhibited by the holographic object 12 at the contact point in response to different applied forces.

Figure 2:
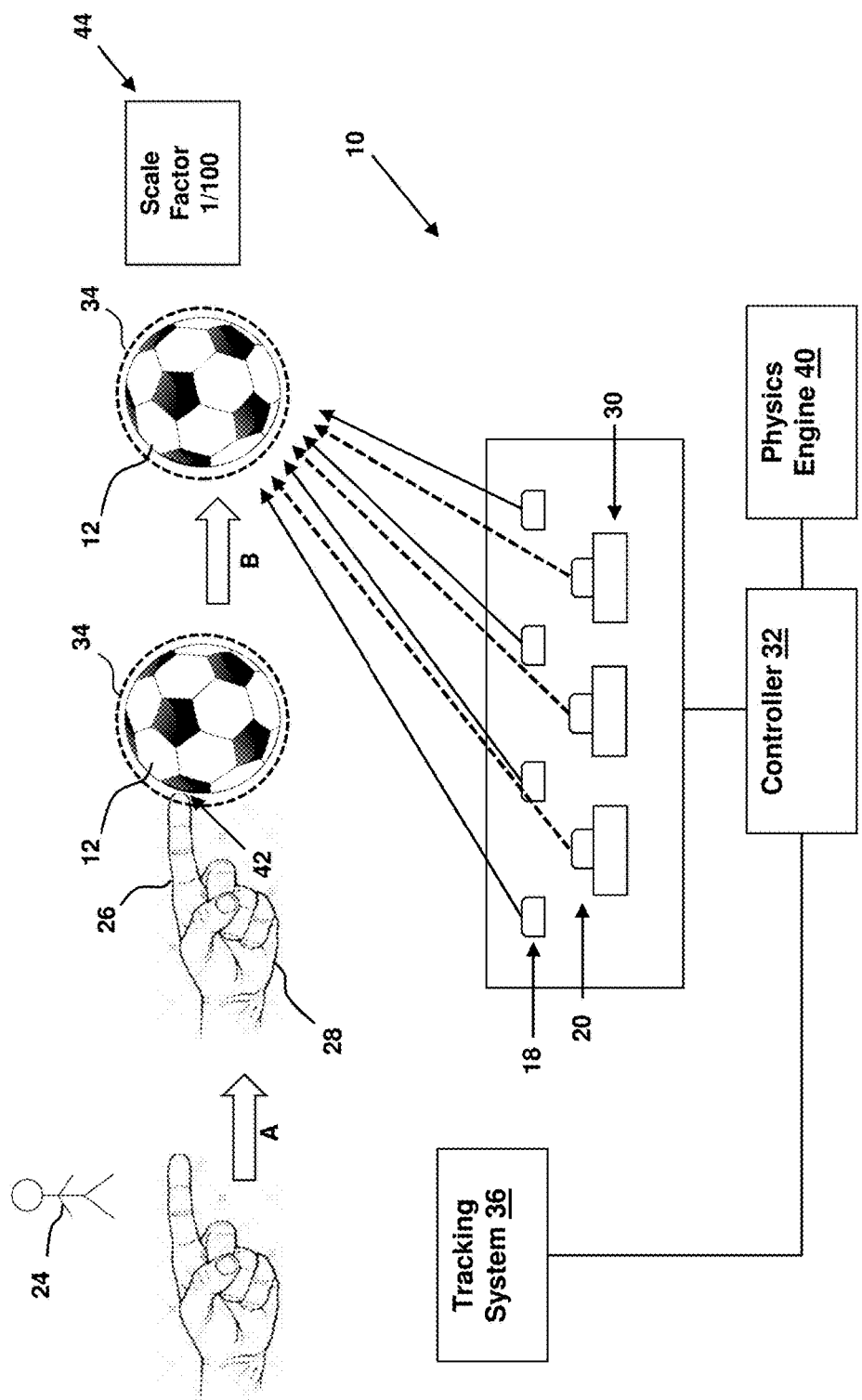
FIG. 2 depicts the system for simulating forces using holographic objects of FIG. 1, wherein a push force has been applied to a holographic object according to embodiments.
Figure 3:
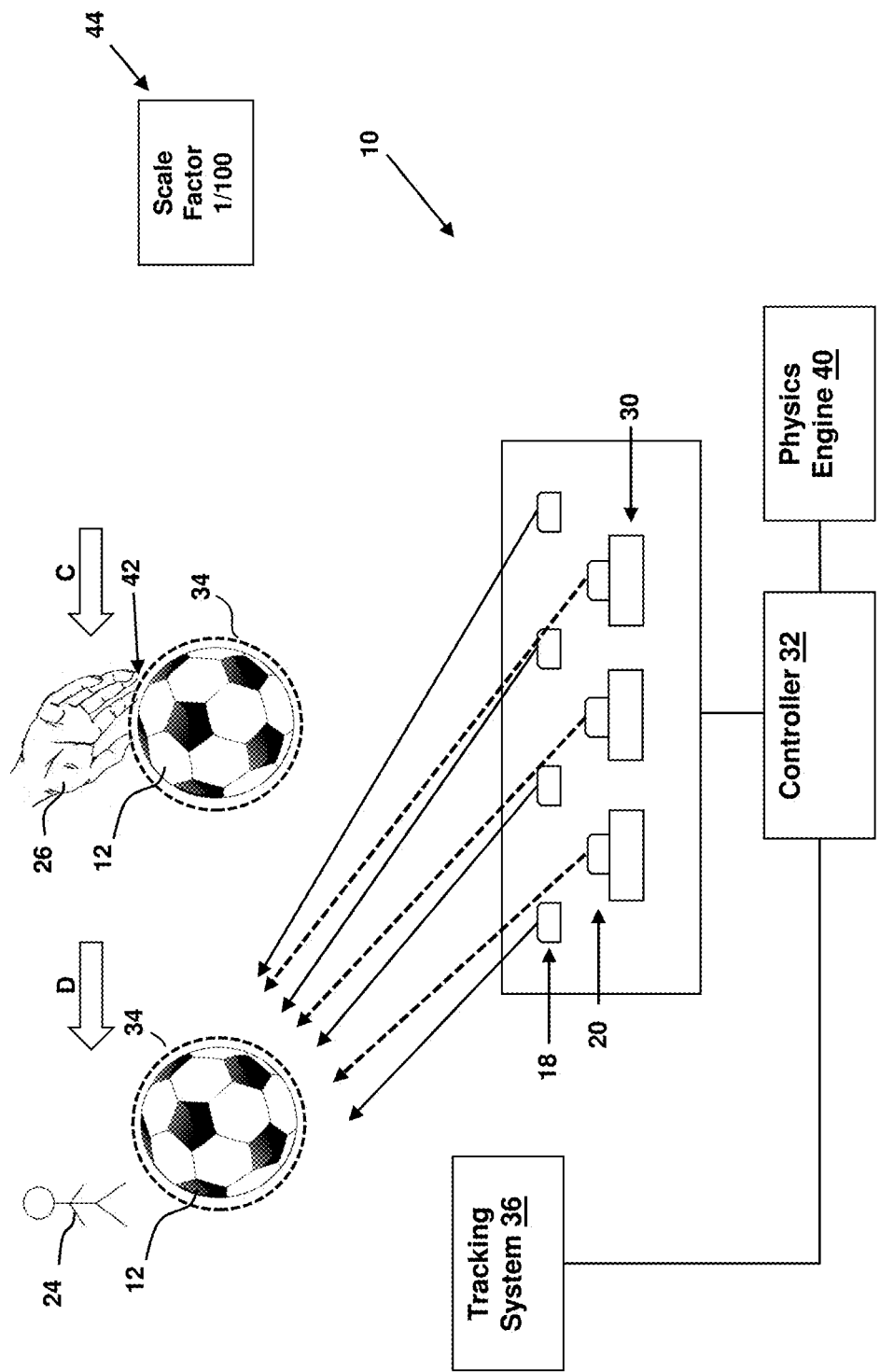
FIG. 3 depicts the system for simulating forces using holographic objects of FIG. 1, wherein a pull force has been applied to a holographic object according to embodiments.

In FIG. 2, the user 24 has applied a force to a holographic object 12, in this case a push force at a contact point 42 (or plurality of contact points 42) on the holographic object 12. The tracking system 36 tracks the user's hand 26 and/or finger 28 as it approaches (arrow A) and contacts the holographic object 12 at the contact point 42. Based on the tracking (e.g., the speed and direction of movement of the user's hand 26 and/or finger 28), the characteristics of the real life equivalent of the holographic object 12 (e.g., size, weight, shape, velocity, etc.), and/or the location of the contact point 42 on the holographic object 12, the physics engine 40 determines how much force will be applied to the holographic object 12, as well as the response (arrow B) of the holographic object 12 to the applied force (e.g., away from the user 24 in FIG. 2). Based on the force information provided by the physics engine 40, the controller 32 adjusts (via a change in the acoustic radiation force) the haptic effect of the holographic object 12 at the contact point 42 accordingly. For example, the greater the applied force at the contact point 42, the greater the haptic effect generated at the contact point 42 on the holographic object 12 and experienced by the user 24. Similarly, the smaller the applied force at the contact point 42, the smaller the haptic effect generated at the contact point 42 on the holographic object 12 and experienced by the user 24.

In addition to adjusting the haptic effect of the holographic object 12 at the contact point 42, the physics module 40 determines how the holographic object 12 will respond to the applied force and provides this information to the controller 32. The controller 32 then displaces the reference point 34 accordingly, and instructs the array of holographic projectors 18 and the array of ultrasound transducers 20 to generate and align the visible holographic object 16 and the invisible holographic object 14 at the reference point 34 as the reference point 34 moves is space in response to the applied force. Advantageously, the user 24 can not only feel (via the haptic effect) the application of the force to the holographic object 12, but also observe how the applied force affects the holographic object 12. To this extent, the holographic system 10 can be used, for example, in an educational setting (e.g., a physics classroom) to provide students with an interactive and dynamic experience.

According to embodiments, the feel and reaction of each individual holographic object 12 in response an applied force may be proportional (e.g., on a scale) to its real world counterpart, thereby providing a rich and immersive experience to the user 24. The applied force may be by scaled, for example based on a scaling factor 44 (e.g., $\frac{1}{100}$, $\frac{1}{10}$, etc.) to provide a scaled force, wherein the haptic effect of the holographic object 12 at the contact point 42 is adjusted to correspond to the scaled force. When created, each different holographic object 12 will be uniquely assigned a specific range of haptic effects corresponding to a specific range of applied forces, including a maximum and minimum force. In this way, just as in the real world, each different holographic object 12 will react in a distinct manner in response to a given applied force. As depicted in FIG. 2, the scaling factor 44 may be displayed adjacent the holographic object 12.

In FIG. 3, the user 24 has applied a force to a holographic object 12, in this case a pull force at a contact point 42 (or plurality of contact points 42) on the holographic object 12. The tracking system 36 tracks the user's hand 26 and/or finger as it approaches (arrow C) and contacts the holographic object 12 at the contact point 42. Based on the tracking (e.g., the speed and direction of movement of the user's hand 26 and/or finger), the characteristics of the real life equivalent of the holographic object 12 (e.g., size, weight, shape, velocity, etc.), and/or the location of the contact point 42 on the holographic object 12, the physics engine 40 determines how much force will be applied to the holographic object 12, as well as the response (arrow D) of the holographic object 12 to the applied force (e.g., toward the user 24 in FIG. 3). Based on the force information provided by the physics engine 40, the controller 32 adjusts (via a change in the acoustic radiation force) the haptic effect of the holographic object 12 at the contact point 42 accordingly.

According to embodiments, other types of forces, such as a drag force, rotational force, impact force, etc., may also be applied to the holographic object 12 by the user 24. Regardless of the type of force applied by the user 24 to the holographic object 12, the controller 32 is configured to displace the holographic object 12 based on the force applied by the user 24. According to other embodiments, the controller 32 may generate and displace one or more holographic objects 12 in space independently of the user 24 (at least initially). The user 24 may interact with the moving holographic object(s) 12 and experience the force(s) associated moving holographic object(s) 12. An example of this behavior is depicted in FIG. 4, wherein a pair of holographic objects 12A, 12B are generated and displaced toward each other under control of the controller 32.

Figure 4:
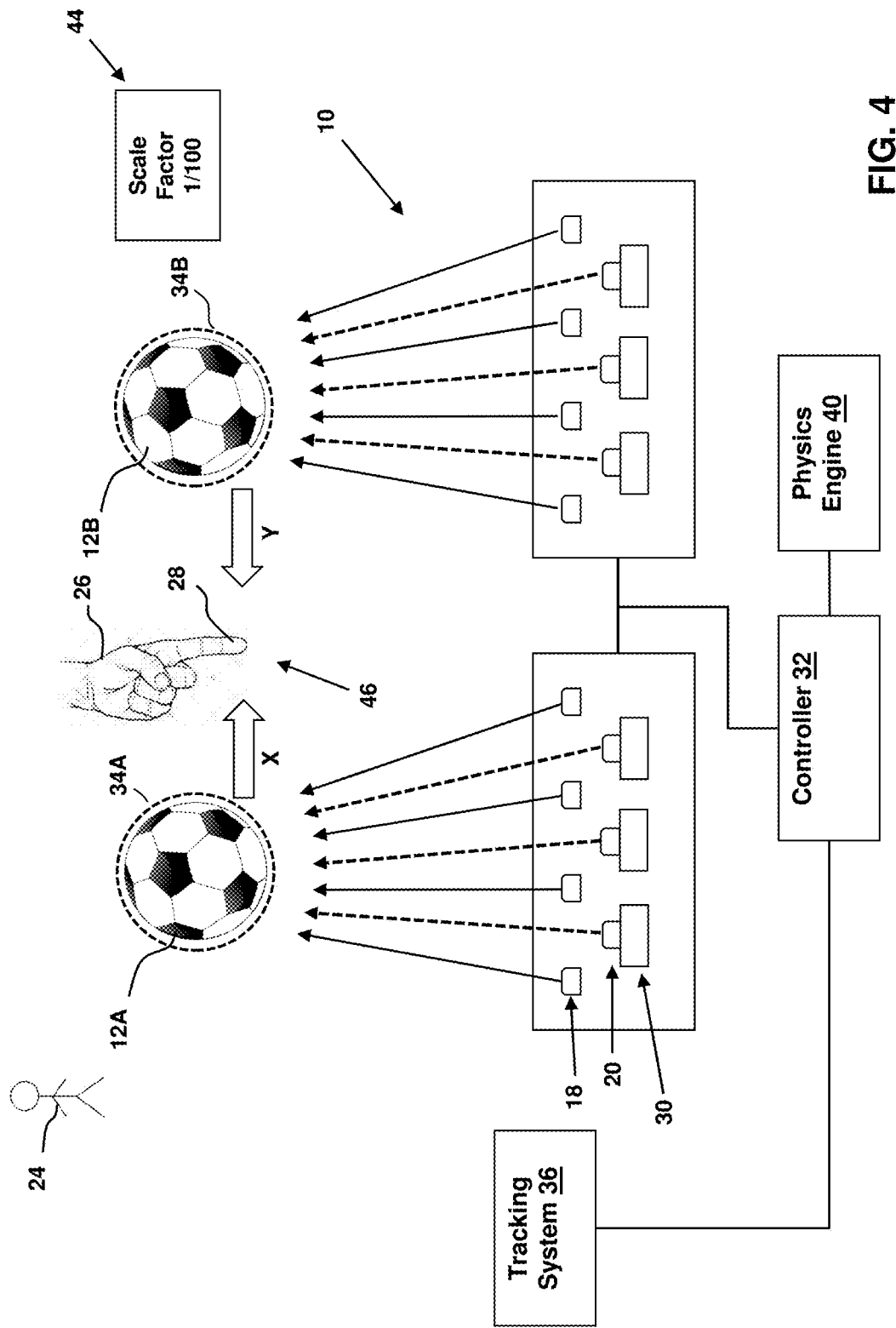
FIG. 4 depicts the system for simulating forces using holographic objects of FIG. 1, wherein a impact force has been applied to a user's finger by a pair of colliding holographic objects.

In FIG. 4, the pair of holographic objects 12A, 12B are generated and displaced as indicated by arrows X and Y toward an impact point 46 under control of the controller 32. The user 24 has placed a finger 28 at the impact point 46 in order to experience the impact force generated at the impact point 46 by the collision of the pair of holographic objects 12A, 12B. When the controller 32 determines that the reference points 34A, 34B of the pair of holographic objects 12A, 12B have reached the impact point 46, the controller 32 adjusts the acoustic radiation force (and thus the haptic effect) of the pair of holographic objects 12A, 12B at the impact point 46, allowing the user 24 to experience the collision of the pair of holographic objects 12A, 12B. As in the previously described examples, the physics engine 40 determines how much force will be applied to the finger 28 of the user at the impact point 46 by the pair of holographic objects 12A, 12B, based on the characteristics of the real life equivalent of the holographic objects 12A, 12B (e.g., size, weight, shape, velocity, etc.), which may be scaled in accordance with the scale factor 44. Based on the determined force, the haptic effect of the pair of holographic objects 12A, 12B at the impact point 46 is adjusted.

As detailed above, the holographic system 10 may be used in an educational setting where users may interact with one or more stationary and/or moving holographic objects 12. Another application is in the field of entertainment. For example, holographic objects 12 may be generated and displayed coming out of a movie screen (e.g., during a 3-D movie). The holographic objects 12 may be displaced such that they appear to be rushing from the screen toward a user in the movie theater. The holographic objects 12 may be grabbed by the user or may impact against the user's body. This immersive interaction enhances the user's experience during the playing of a movie.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the program product of the present invention may be manually loaded directly in a computer system via a storage medium such as a CD, DVD, etc., the program product may also be automatically or semi-automatically deployed into a computer system by sending the program product to a central server or a group of central servers. The program product may then be downloaded into client computers that will execute the program product. Alternatively the program product may be sent directly to a client system via e-mail. The program product may then either be detached to a directory or loaded into a directory by a button on the e-mail that executes a program that detaches the program product into a directory. Another alternative is to send the program product directly to a directory on a client computer hard drive.

Figure 5:
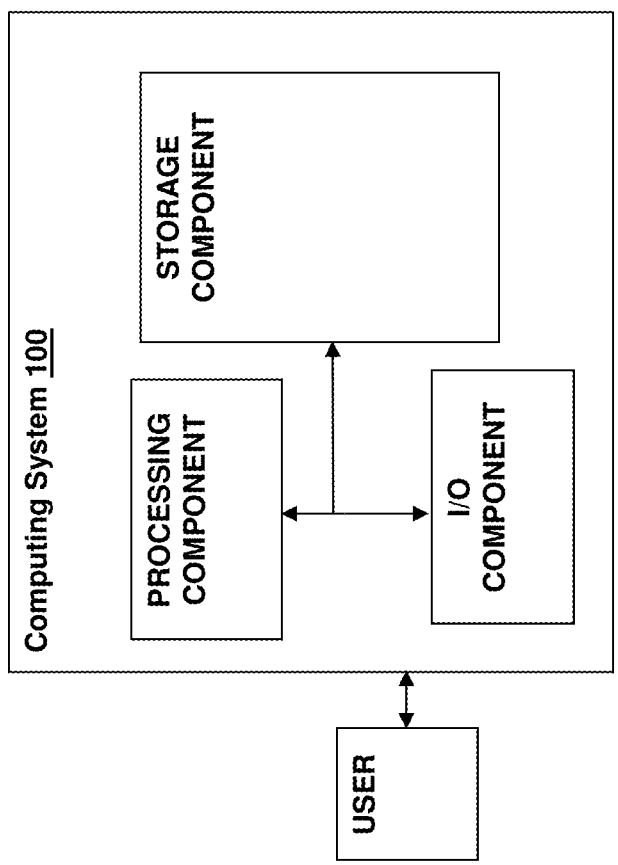
FIG. 5 depicts a processing system for simulating forces using holographic objects according to embodiments.

FIG. 5 depicts an illustrative processing system 100 (e.g., within a mobile device) for implementing the present invention, according to embodiments. The processing system 100 may comprise any type of computing device and, and for example includes at least one processor, memory, an input/output (I/O) (e.g., one or more I/O interfaces and/or devices), and a communications pathway. In general, processor(s) execute program code, which is at least partially fixed in memory. While executing program code, processor(s) can process data, which can result in reading and/or writing transformed data from/to memory and/or I/O for further processing. The pathway provides a communications link between each of the components in processing system 100. I/O can comprise one or more human I/O devices, which enable a user to interact with processing system 100.

Figure 6:
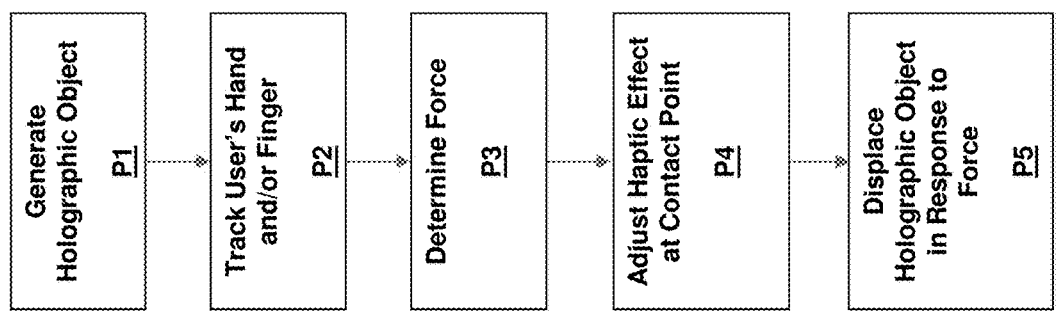
FIG. 6 depicts a process for simulating forces using holographic objects according to embodiments.

FIG. 6 depicts a process for simulating forces using holographic objects according to embodiments. At P1, a holographic object is generated and displayed. At P2, a user's hand and/or finger are tracked relative to the holographic object. At P3, a force applied by the user's hand and/or finger to the holographic object is determined. At P4, the haptic effect at the point of contact between the user's hand and/or finger and the holographic object is adjusted based on the applied force. At P5, the holographic object is displaced in response to the applied force.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

What is claimed is:

1. A method for simulating forces using holographic objects, comprising:
   generating an invisible holographic object, the invisible holographic object providing a haptic effect;
   displaying a visible holographic object;
   aligning the visible holographic object and the invisible holographic object to provide a visible and touchable combined holographic object, the combined holographic object providing the haptic effect;
   applying a force to the combined holographic object, the applied force causing a displacement of the combined holographic object and including an amplitude and direction;
   adjusting the haptic effect of the combined holographic object to generate an adjusted haptic effect representative of an effect of the applied force on the combined holographic object, wherein adjusting the haptic effect of the combined holographic object includes scaling the applied force based on a scaling factor to provide a scaled force, wherein the adjusted haptic effect corresponds to the scaled force, such that a feel and reaction of the combined holographic object to the scaled force is proportional to a feel and reaction of a real world counterpart of the combined holographic object to the applied force; and displaying the scale factor with the combined holographic object.

2. The method according to claim 1, wherein the applied force includes at least one of a pull force, push force, drag force, rotational force, or impact force.

3. The method according to claim 1, wherein the force is applied to at least one contact point on the combined holographic object, and wherein the haptic effect is adjusted at the at least one contact point.

4. The method according to claim 1, wherein the invisible holographic object is generated using ultrasonic waves.

5. The method according to claim 4, wherein adjusting the haptic effect of the combined holographic object includes varying an intensity of the ultrasonic waves to generate the adjusted haptic effect.

6. The method according to claim 1, further including interacting with the combined holographic object and experiencing the adjusted haptic effect of the combined holographic object.

7. The method according to claim 1, wherein aligning the visible holographic object and the invisible holographic object to provide the combined holographic object further includes:
assigning a reference point to the invisible holographic object; and
displaying the visible holographic object such that it remains aligned with the reference point in response to a displacement of the reference point.

8. The method according to claim 7, wherein the reference point surrounds the invisible holographic object.

9. The method according to claim 1, wherein the applied force displaces the combined holographic object toward a second combined holographic object, the method including;
determining a collision force of the combined holographic object and the second combined holographic object; and
adjusting the haptic effects of the combined holographic object and the second combined holographic object based on the collision force.

10. A computerized system for simulating forces using holographic objects by performing a method, the method comprising:
generating an invisible holographic object using ultrasonic waves, the invisible holographic object providing a haptic effect;
displaying a visible holographic object;
aligning the visible holographic object and the invisible holographic object to provide a visible and touchable combined holographic object, the combined holographic object providing the haptic effect;
applying a force to the combined holographic object, the applied force causing a displacement of the combined holographic object and including an amplitude and direction;
adjusting the haptic effect of the combined holographic object to generate an adjusted haptic effect representative of an effect of the applied force on the combined holographic object, wherein adjusting the haptic effect of the combined holographic object includes scaling the applied force based on a scaling factor to provide a scaled force, wherein the adjusted haptic effect corresponds to the scaled force, such that a feel and reaction of the combined holographic object to the scaled force is proportional to a feel and reaction of a real world counterpart of the combined holographic object to the applied force; and displaying the scale factor with the combined holographic object.

11. The computerized system according to claim 10, wherein the applied force includes at least one of a pull force, push force, drag force, rotational force, or impact force, wherein the force is applied to at least one contact point on the combined holographic object, and wherein the haptic effect is adjusted at the at least one contact point.

12. The computerized system according to claim 10, wherein adjusting the haptic effect of the combined holographic object includes varying an intensity of the ultrasonic waves to generate the adjusted haptic effect.

13. The computerized system according to claim 10, further including interacting with the combined holographic object and experiencing the adjusted haptic effect of the combined holographic object.

14. The computerized system according to claim 10, wherein aligning the visible holographic object and the invisible holographic object to provide the combined holographic object further includes:
assigning a reference point to the invisible holographic object; and
displaying the visible holographic object such that it remains aligned with the reference point in response to a displacement of the reference point.

15. The computerized system according to claim 14, wherein the reference point surrounds the invisible holographic object.

16. A computer program product stored on a computer readable storage medium, which when executed by a computer system, performs a method for simulating forces using holographic objects, the method including:
generating an invisible holographic object, the invisible holographic object providing a haptic effect;
displaying a visible holographic object;
aligning the visible holographic object and the invisible holographic object to provide a visible and touchable combined holographic object, the combined holographic object providing the haptic effect;
applying a force to the combined holographic object, the applied force causing a displacement of the combined holographic object and including an amplitude and direction;
adjusting the haptic effect of the combined holographic object to generate an adjusted haptic effect representative of an effect of the applied force on the combined holographic object, wherein adjusting the haptic effect of the combined holographic object includes scaling the applied force based on a scaling factor to provide a scaled force, wherein the adjusted haptic effect corresponds to the scaled force, such that a feel and reaction of the combined holographic object is proportional to a feel and reaction of a real world counterpart of the combined holographic object to the applied force; and
displaying the scale factor with the combined holographic object.

* * * * *